(12) United States Patent
Nakano (10) Patent No.: US 10,056,676 B2
(45) Date of Patent: Aug. 21, 2018

(54) ANTENNA DEVICE AND ELECTRONIC APPLIANCE

(71) Applicant: Murata Manufacturing Co., Ltd., Nagaokakyo-shi, Kyoto-fu (JP)

(72) Inventor: Shinichi Nakano, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 45 days.

(21) Appl. No.: 15/290,122

(22) Filed: Oct. 11, 2016

(65) Prior Publication Data

US 2017/0033435 A1 Feb. 2, 2017

Related U.S. Application Data

(63) Continuation of application No. PCT/JP2015/062035, filed on Apr. 21, 2015.

(30) Foreign Application Priority Data

Apr. 23, 2014 (JP) .................. 2014-088927

(51) Int. Cl.
| | |
|---|---|
| *H01Q 1/24* | (2006.01) |
| *H01Q 7/00* | (2006.01) |
| *H01Q 1/38* | (2006.01) |
| *H01Q 1/48* | (2006.01) |
| *H01Q 9/28* | (2006.01) |

(Continued)

(52) U.S. Cl.
CPC ............ *H01Q 1/24* (2013.01); *H01Q 1/241* (2013.01); *H01Q 1/38* (2013.01); *H01Q 1/48* (2013.01); *H01Q 7/00* (2013.01); *H01Q 9/285* (2013.01); *H01Q 13/10* (2013.01); *H04B 5/0031* (2013.01)

(58) Field of Classification Search
CPC ............ H01Q 1/24; H01Q 1/241; H01Q 1/38; H01Q 1/48; H01Q 7/00; H01Q 9/285; H01Q 13/10; H01Q 7/06
See application file for complete search history.

(56) References Cited

U.S. PATENT DOCUMENTS 9,847,579 B2 * 12/2017 Nakano .................. H01Q 7/08
2014/0087658 A1 3/2014 Hou et al.
(Continued)

FOREIGN PATENT DOCUMENTS

| JP | 2006-195802 A | 7/2006 |
|---|---|---|
| JP | 2013-162195 A | 8/2013 |
| WO | 2013/035820 A1 | 3/2013 |

OTHER PUBLICATIONS

Official Communication issued in corresponding International Application PCT/JP2015/062035, dated Jun. 9, 2015.

*Primary Examiner* — Tho G Phan
(74) *Attorney, Agent, or Firm* — Keating & Bennett, LLP (57) ABSTRACT

An antenna device includes a planar conductor on a side of a display device that is opposite to a display surface side of the display device and a power feeding coil including a spiral-shaped coil conductor with a coil aperture at a center thereof. The planar conductor includes a cutout portion. The coil aperture of the power feeding coil is superposed with the cutout portion of the planar conductor in plan view. A magnetic sheet that is superposed with the coil conductor in plan view is arranged between the display device and the planar conductor and between the display device and the power feeding coil.

20 Claims, 7 Drawing Sheets

(51) Int. Cl.
*H04B 5/00* (2006.01)
*H01Q 13/10* (2006.01)

(56) References Cited

U.S. PATENT DOCUMENTS

2015/0207205 A1* 7/2015 Kato .................. H01Q 7/06
                                                  343/702
2017/0351884 A1* 12/2017 Arimura ............ G06K 7/087

\* cited by examiner

ANTENNA DEVICE AND ELECTRONIC APPLIANCE

CROSS REFERENCE TO RELATED APPLICATIONS

This application claims the benefit of priority to Japanese Patent Application 2014-088927 filed on Apr. 23, 2014 and is a Continuation Application of PCT/JP2015/062035 filed on Apr. 21, 2015. The entire contents of each application are hereby incorporated by reference.

BACKGROUND OF THE INVENTION

1. Field of the Invention

The present invention relates to antenna devices preferably for use in near field communication (NFC) systems and so forth and to communication appliances equipped with such an antenna device.

2. Description of the Related Art

It is becoming increasingly common for NFC systems to be incorporated into small-sized electronic appliances such as cellular phone terminals and tablet PCs. In particular, in the case of a cellular phone terminal, an NFC antenna is demanded with which communication can be performed in a state where a display surface of the cellular phone terminal is made to face an antenna device of a communication partner.

However, as the bodies of cellular phone terminals become smaller and the degree of integration of cellular phone terminals becomes ever higher, it is becoming increasingly difficult to secure a space in which to mount an antenna device in cellular phone terminals. Furthermore, there is also a tendency for display devices (displays) to becomes thinner while the display area thereof becomes larger, and it is often the case that a metal plate (conductor layer) that doubles as a shield is arranged over the entirety of a non-display surface of a display panel in order to reduce damage caused by external impacts. In such a case, there is a problem in that the antenna characteristics are degraded by unwanted coupling between the antenna device and the metal plate when the antenna device is arranged close to the display device.

However, Japanese Unexamined Patent Application Publication No. 2006-195802 discloses an apparatus in which an antenna is formed of a transparent electrode such as an ITO electrode on the display device and consequently a display surface of the display device can be used as a communication surface.

The conductivity of a transparent electrode such as an ITO electrode is very low compared with that of copper or aluminum. Consequently, conductor loss is large and excellent antenna characteristics cannot be obtained when an antenna is formed of a transparent electrode such as an ITO electrode as described in Japanese Unexamined Patent Application Publication No. 2006-195802.

SUMMARY OF THE INVENTION

Accordingly, preferred embodiments of the present invention provide an antenna device that is configured such that, when the antenna device is built into an electronic appliance equipped with a display device in which a conductor layer is arranged, communication is performed with excellent communication characteristics from a display surface side of the display device, and provide an electronic appliance that includes the antenna device.

An antenna device according to a preferred embodiment of the present invention that is to be built into an electronic appliance equipped with a display device including a conductor layer, includes a planar conductor that is arranged on a side of the display device that is opposite to a display surface side of the display device; and a power feeding coil that includes a loop-shaped or spiral-shaped coil conductor with a coil aperture at a center thereof; wherein the power feeding coil is arranged so as to be close to the planar conductor and such that at least a portion of the coil aperture thereof is located closer to an outside of the antenna device than an outer edge of the planar conductor in plan view, and a magnetic sheet that is superposed with the coil conductor in plan view is arranged between the display device and the planar conductor and between the display device and the power feeding coil.

With the above-described configuration, communication is performed with excellent communication characteristics from the display surface side of the electronic appliance in the case where the electronic appliance includes a display device including a conductor layer.

It is preferable that the power feeding coil be arranged such that at least a portion of the coil conductor thereof is superposed with the planar conductor in plan view. As a result, the coil conductor and the planar conductor strongly couple with each other and the ability of the planar conductor to function as an element that radiates magnetic flux is increased.

It is preferable that the planar conductor include a cutout portion and that at least a portion of the coil aperture of the power feeding coil be superposed with the cutout portion in plan view. As a result, the coil conductor and the planar conductor strongly couple with each other and the ability of the planar conductor to function as an element that radiates magnetic flux is increased.

It is preferable that the magnetic sheet be arranged in at least a portion of a region where the display device and the coil are superposed with each other in plan view. As a result, unwanted coupling between the coil conductor of the power feeding coil and a conductive member of the display device is significantly reduced or prevented and the ability of the planar conductor to function as an element that radiates magnetic flux is maintained with substantially no generation of eddy currents in a conductive member of the display device.

It is preferable that at least a portion of the coil conductor be not superposed with the magnetic sheet and the display device in plan view. Thus, not only does the coil conductor indirectly collect/radiate magnetic flux as a result of the coil conductor coupling with the planar conductor, but the coil conductor also directly collects/radiates magnetic flux.

It is preferable that the planar conductor be a shield that is arranged on a side of the display device that is opposite to a display surface side of the display device. Thus, a shield member of the display device is able to double as a portion of the antenna device such that reductions in size and cost are achieved.

It is preferable that an outer shape of the magnetic sheet be smaller than an outer shape of the planar conductor and larger than an outer shape of the coil conductor. As a result, unwanted coupling between the power feeding coil and the display device is effectively reduced or prevented and the magnetic sheet does not hinder the planar conductor from acting as a radiating element.

It is preferable that the antenna device further include a circuit board on which a power feeding circuit is provided, the circuit board being arranged on a side of the planar conductor that is opposite to a display device side of the planar conductor. The power feeding coil is preferably arranged on a surface of the planar conductor that is on a side opposite to the display surface side of the planar conductor. The power feeding coil is preferably connected to the power feeding circuit provided on the circuit board via a connection conductor. With this configuration, the power feeding circuit is able to be easily connected to the antenna device using a simple structure.

It is preferable that the antenna device further include a circuit board on which a power feeding circuit is provided, the power feeding coil being formed on the circuit board. Thus, the number of components is reduced and assembly is easy.

It is preferable that the antenna device further include a circuit board that is arranged on a side of the planar conductor that is opposite to a display device side of the planar conductor, that the power feeding coil include a base layer and a coil conductor that is provided on the base layer, that the power feeding coil be arranged on a surface of the circuit board that is on a planar conductor side of the circuit board and that a second magnetic sheet be arranged between the power feeding coil and the circuit board. With this configuration, there is no unwanted coupling between the power feeding coil and a conductor such as a ground conductor provided on the circuit board and loss due to eddy currents and changes in characteristics are significantly reduced or prevented. In addition, it is possible to remove restrictions on the design of conductor patterns provided on the circuit board.

An electronic appliance according to a preferred embodiment of the present invention includes an antenna device according to one of the various preferred embodiments of the present invention described above; a display device; and a casing that accommodates the antenna device and the display device.

According to various preferred embodiments of the present invention, communication is able to be performed with excellent communication characteristics from the display surface side of an electronic appliance in the case where the electronic appliance includes a display device including a conductor layer.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereafter, a plurality of preferred embodiments of the present invention will be described by giving a number of specific examples of the present invention while referring to the drawings. Like symbols denote like elements in the drawings. Each preferred embodiment is an illustrative example and elements, portions, features, configurations, etc. illustrated in different preferred embodiments can be substituted for one another or combined with each other. In the second and subsequent preferred embodiments, description of matters common to the first preferred embodiment will be omitted and only the differences will be described. In particular, the same operational effects achieved using the same configurations will not be repeatedly described in the individual preferred embodiments of the present invention.

First Preferred Embodiment

Figure 1A:
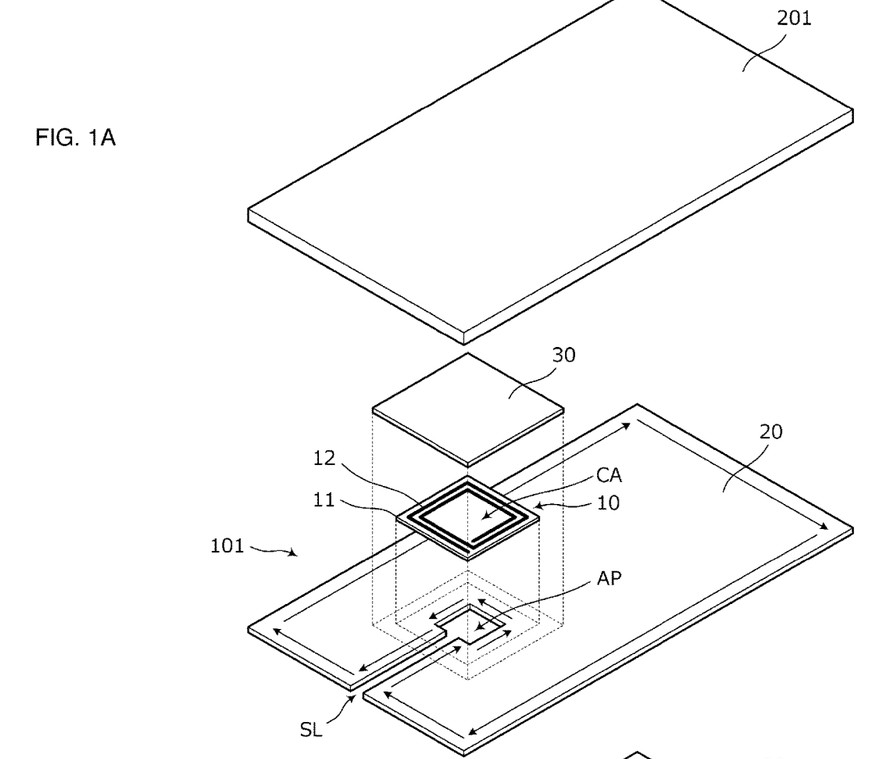
FIG. 1A is an exploded perspective view of an antenna device according to a first preferred embodiment of the present invention, the antenna device being close to a display device.
Figure 1B:
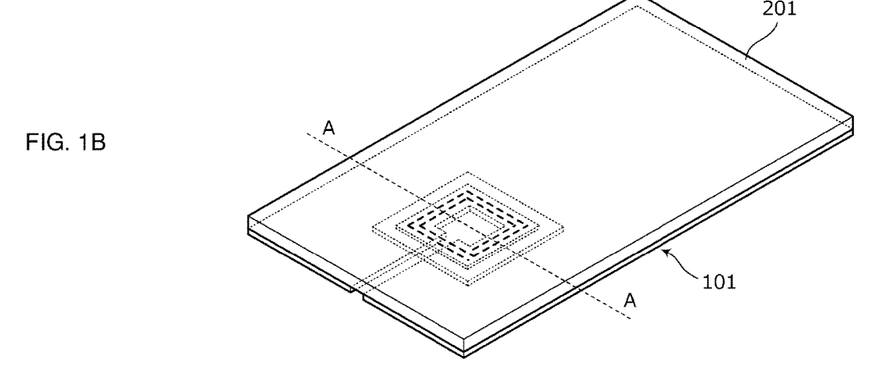
FIG. 1B is a perspective view of a state where the display device and the antenna device are stacked one on top of the other.
Figure 2:
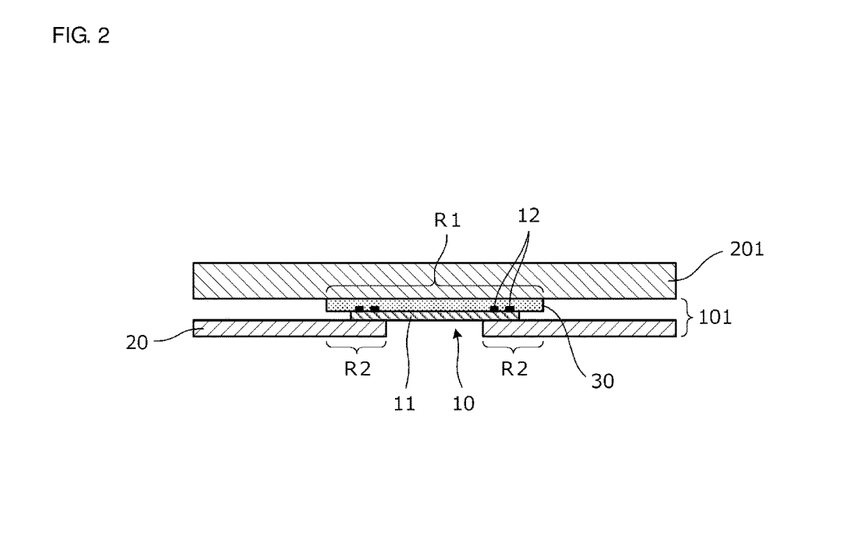
FIG. 2 is a sectional view taken along A-A in FIG. 1B.

FIG. 1A is an exploded perspective view of the main portion of an electronic appliance that includes an antenna device according to a first preferred embodiment of the present invention, the antenna device being close to a display device, and FIG. 1B is a perspective view of a state where the display device and the antenna device are stacked one on top the other. In addition, FIG. 2 is a sectional view taken along A-A in FIG. 1B.

An antenna device 101 of this preferred embodiment is arranged on a side of a display device 201 (hereafter referred to as "rear surface side") that is opposite to a display surface side of the display device 201. The antenna device 101 includes a planar conductor 20, power feeding coil 10 and a magnetic sheet 30. An upper surface of the display device 201, in the state illustrated in FIGS. 1A and 1B, is a display surface of the display device 201.

The display device 201 is an organic EL display or a liquid crystal display and conductive members such as pixel electrodes defined by transparent electrodes such as ITO electrodes, a planar electrode to counteract noise and driving electrodes to apply a voltage or supply a current to the pixel electrodes are provided inside the display device.

The planar conductor 20 is a metal plate that is arranged on a surface (rear surface) of the display device 201 that is on the opposite side to the display surface of the display device 201 and defines and functions as a reinforcement member and a shield.

In the description of preferred embodiments of the present invention, "planar conductor" refers to a conductive member at least a portion of which has a planar shape, and the surface thereof need not only have a flat shape and may have a curved shape or a three-dimensional shape.

In the case where a metal plate that defines and functions as a reinforcement member and a shield is not arranged in the display device 201, a ground conductor of a circuit board may be used as the planar conductor 20, for example.

The planar conductor 20 is arranged on the rear surface side of the display device 201 with respect to the display surface. A cutout portion is provided in the planar conductor 20, the cutout portion being constituted by a slit SL and an aperture AP.

The power feeding coil 10 includes a base sheet 11 and a coil conductor 12 on the base sheet 11. The coil conductor 12 preferably has a rectangular or substantially rectangular spiral shape having a coil aperture in the center thereof. The "base sheet 11" is an example of a "base layer".

The power feeding coil 10 is arranged so as to be close to the planar conductor 20 (e.g., located adjacent to or in a vicinity of the planar conductor 20) and such that at least a portion of a coil aperture CA thereof is located closer to an outside of the antenna device 101 than an outer edge of the planar conductor 20 in plan view. When the planar conductor 20 includes a cutout portion, "an outer edge of the planar conductor" in a preferred embodiment of the present invention may refer to the outer edge of a portion that extends along this cutout portion.

In this preferred embodiment, the coil aperture CA of the coil conductor 12 is arranged so as to be superposed with the aperture AP and a portion of the slit SL of the planar conductor 20 in plan view.

The magnetic sheet 30 is arranged between the display device 201 and the planar conductor 20 and between the display device 201 and the power feeding coil 10, and is arranged so as to be superposed with the coil conductor 12 in plan view.

The outer shape of the magnetic sheet 30 is smaller than the outer shape of the planar conductor 20 but larger than the outer shape of the coil conductor 12.

A power feeding circuit is connected to the coil conductor 12 of the power feeding coil 10. Since the power feeding coil 10 is arranged such that the coil aperture CA thereof is superposed with the aperture AP and a portion of the slit SL of the planar conductor 20 in plan view, the coil conductor 12 of the power feeding coil 10 magnetic field couples with the planar conductor 20.

Since the cutout portion, which includes the aperture AP and the slit SL, is provided in this preferred embodiment, there are many portions where an edge of the coil conductor 12 and the planar conductor 20 are superposed with each other. Consequently, the coil conductor 12 and the planar conductor 20 strongly couple with each other and the ability of the planar conductor 20 to define and function as an element that radiates magnetic flux is increased.

In the case where the antenna device 101 is used as a transmission antenna, an induced current flows in the planar conductor 20 along a path indicated by the arrows in FIG. 1 due to the magnetic field generated by the coil conductor 12 and the planar conductor 20 acts as a radiating element that radiates magnetic flux. Therefore, communication is able to be performed as a result of the planar conductor 20 magnetic field coupling with the antenna of a communication partner that has been brought close to the display surface side of the display device 201.

Conversely, in the case where the antenna device 101 is used as a reception antenna, an induced current flows in the planar conductor 20 along the path indicated by the arrows in FIG. 1 due to the planar conductor 20 coupling with the antenna of a communication partner that has been brought close to the display surface side of the display device 201 and a current is induced in the coil conductor 12 of the power feeding coil 10 by the magnetic field generated by the planar conductor 20.

In FIG. 2, if there were no magnetic sheet 30, there would be unwanted coupling between the coil conductor 12 of the power feeding coil 10 and a conductive member of the display device 201 and eddy currents would be generated in a region R1 of the display device 201. In the antenna device 101 of this preferred embodiment, since the magnetic sheet 30 is arranged between the coil conductor 12 of the power feeding coil 10 and the display device 201, unwanted coupling between the coil conductor 12 of the power feeding coil 10 and a conductive member of the display device 201 is significantly reduced or prevented.

Furthermore, in FIG. 2, if there were no magnetic sheet 30, there would be unwanted coupling between the region R1 of the display device 201 and a region R2 of the planar conductor 20 that faces the region R1, leading to eddy currents being generated in the region R2. In the antenna device 101 of this preferred embodiment, since the magnetic sheet 30 is arranged between the planar conductor 20 and the display device 201, unwanted coupling between a metal plate of the display device 201 and the planar conductor 20 is significantly reduced or prevented.

Thus, the metal plate of the display device 201 is shielded from the coil conductor 12, which has high current density, i.e., high magnetic field intensity. In addition, the portion of the planar conductor 20 where the coil conductor is located is shielded from the opposing metal plate of the display device 201 and therefore there is little degradation of the antenna characteristics due to the display device 201 being close to the antenna device 101.

Next, the characteristics of the antenna device 101 according to this preferred embodiment and the characteristics of an antenna device serving as a comparative example will be described.

Figure 3A:
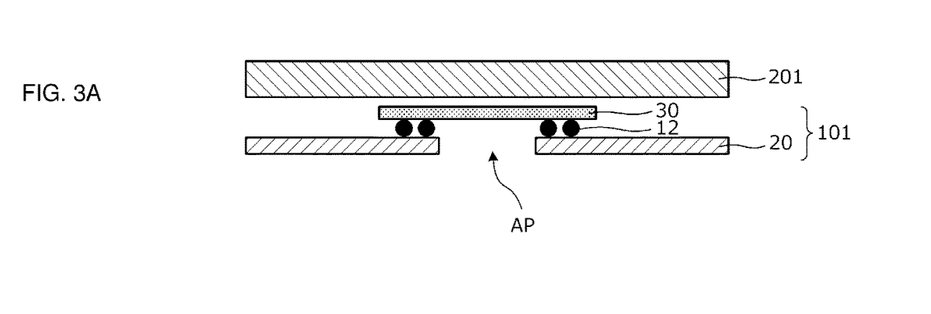
FIG. 3A is a sectional view of a simulation model of an antenna device 101 according to a preferred embodiment of the present invention and FIG. 3B is a sectional view of a simulation model of an antenna device according to a comparative example.
Figure 3B:
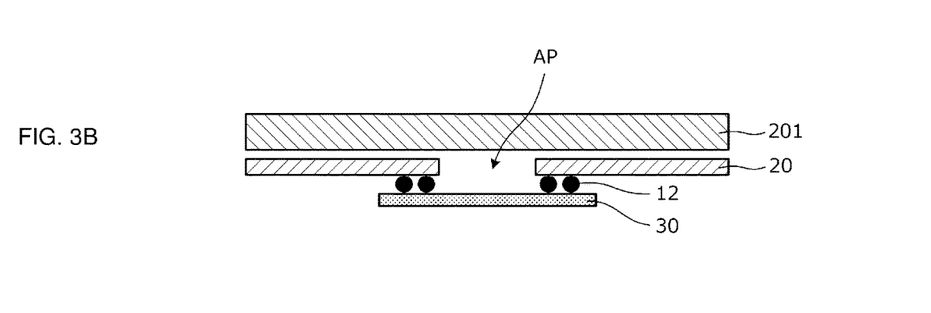

FIG. 3A is a sectional view of a simulation model of the antenna device 101 according to this preferred embodiment and FIG. 3B is a sectional view of a simulation model of the antenna device according to the comparative example. In the model illustrated in FIG. 3A, the magnetic sheet 30, the coil conductor 12 and the planar conductor 20 are arranged by being stacked in this order on the rear surface of the display device 201. In the model of the comparative example illustrated in FIG. 3B, the planar conductor 20, the coil conductor 12 and the magnetic sheet 30 are arranged by being stacked in this order on the rear surface of the display device 201. In FIGS. 3A and 3B, the parameters are as follows.

Outer diameter of coil conductor 12: 20 mm×20 mm
Inner diameter of coil conductor 12: 12 mm×12 mm
Outer shape of planar conductor 20: 65 mm×120 mm
Aperture AP of planar conductor 20: 12 mm×12 mm (same as inner diameter of coil conductor 12)
Outer shape of display device 201: 65 mm×120 mm (same as outer shape of planar conductor 20)

Figure 4:
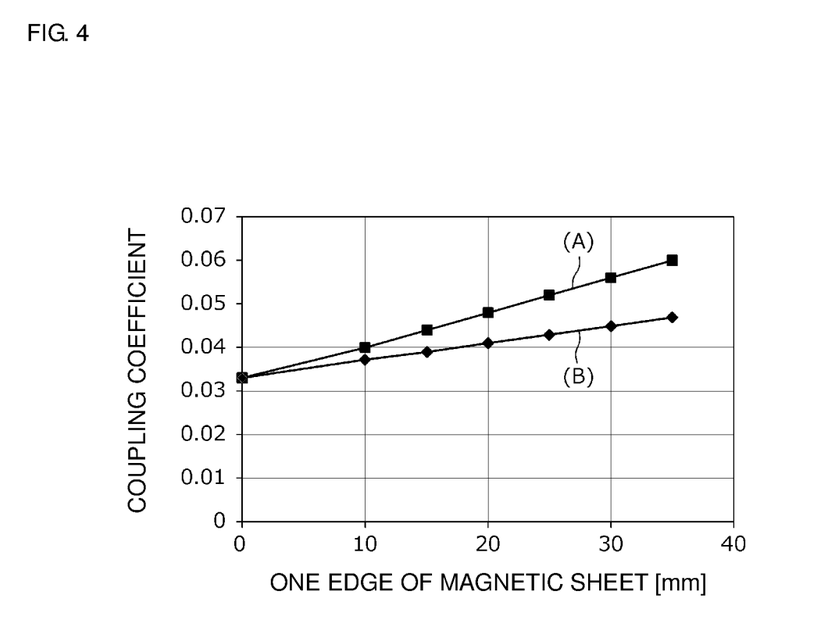
FIG. 4 illustrates changes in the coupling coefficient in coupling with the antenna on the communication partner side that occur when the size of a magnetic sheet 30 is changed in the two antenna devices illustrated in FIGS. 3A and 3B.

FIG. 4 illustrates changes in the coupling coefficient in coupling with the antenna on the communication partner side that occur when the size of the magnetic sheet 30 is changed in the two antenna devices illustrated in FIGS. 3A and 3B. In FIG. 4, A represents the characteristics of the antenna device 101 according to the present preferred embodiment of the present invention and B represents the characteristics of the antenna device according to the comparative example.

For example, when the size of the magnetic sheet 30 is 20 mm×20 mm, which is the same as the size of the outer shape of the coil conductor 12 of the power feeding coil, a higher coupling coefficient is obtained with the antenna device 101 of the present preferred embodiment of the present invention than with the antenna device of the comparative example.

Although the coupling coefficient increases as the size of the magnetic sheet 30 is made larger in both of the two antenna devices, the amount by which the coupling coefficient increases as a result of the magnetic sheet 30 being made larger is greater in the case of the antenna device 101 than in the case of the antenna device of the comparative example. In other words, the effect of significantly reducing or preventing unwanted coupling between the coil conductor 12 and a conductive member of the display device achieved by the magnetic sheet 30 is greater in the case of the antenna device 101 of this preferred embodiment. Since the effect of the planar conductor 20 acting as a radiating element is reduced the larger the size of the magnetic sheet 30 becomes, it is preferable that the size of the magnetic sheet 30 be within a range that does not exceed the size of the outer shape of the display device 201. In particular, it is preferable that the size of the magnetic sheet be set within a range prior to the point where the coupling coefficient begins to decrease as the size of the magnetic sheet is increased.

Figure 5:
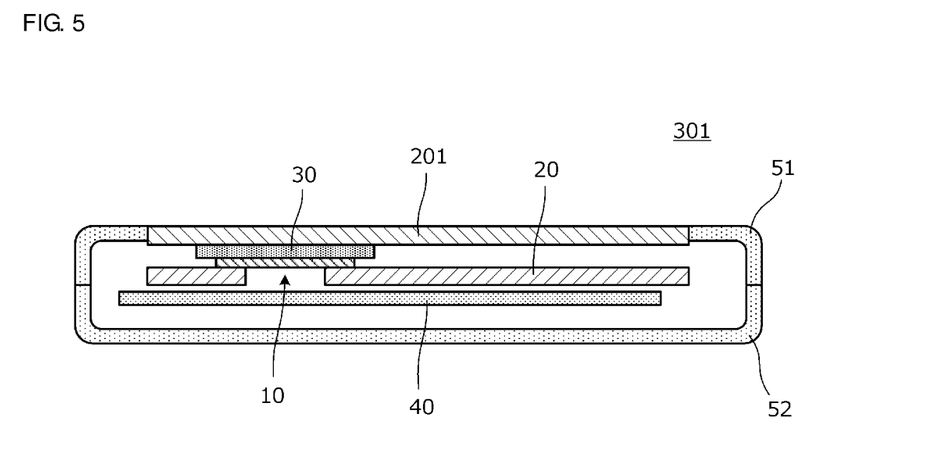
FIG. 5 is a sectional view of an electronic appliance 301 that includes the antenna device 101 of the first preferred embodiment of the present invention.

FIG. 5 is a sectional view of an electronic appliance 301 that includes the antenna device 101 of this preferred embodiment. The electronic appliance 301 includes an upper casing 51, a lower casing 52, the display device 201, the power feeding coil 10, the magnetic sheet 30, the planar conductor 20 and a circuit board 40.

In this example, the magnetic sheet 30 and the power feeding coil 10 preferably are integrated with each other via an adhesive layer to define a multilayer body. The planar conductor 20 is a metal chassis that fixes various components and members in place inside the casing and reinforces the entire appliance. The multilayer body including the magnetic sheet 30 and the power feeding coil 10 may be adhered to an inner surface of the display device 201. In addition, the multilayer body may be adhered to the planar conductor 20.

The circuit board 40 is provided with a power feeding circuit that is connected to the power feeding coil 10.

In this preferred embodiment, unwanted coupling between the coil conductor of the power feeding coil 10 and a conductive member of the display device 201 is significantly reduced or prevented by the magnetic sheet 30 and therefore excellent antenna characteristics are obtained.

Furthermore, since the outer shape of the magnetic sheet 30 is smaller than the outer shape of the planar conductor 20, the magnetic sheet 30 does not hinder the planar conductor 20 from acting as a radiating element.

In addition, although it is sufficient that the magnetic sheet 30 cover at least the coil conductor 12, so long as the magnetic sheet 30 is arranged so as to cover the aperture AP of the planar conductor 20, the magnetic sheet 30 prevents noise from the display device 201 leaking to the outside via the aperture AP.

Although the magnetic sheet 30 preferably is arranged so as to cover the entirety of the power feeding coil 10 in the example illustrated in FIGS. 1A and 1B and FIG. 2, the magnetic sheet 30 may instead be provided at only at positions facing the coil conductor 12 of the power feeding coil 10. In other words, an aperture that is superposed with the coil aperture CA may be provided in the magnetic sheet 30.

Second Preferred Embodiment

Figure 6:
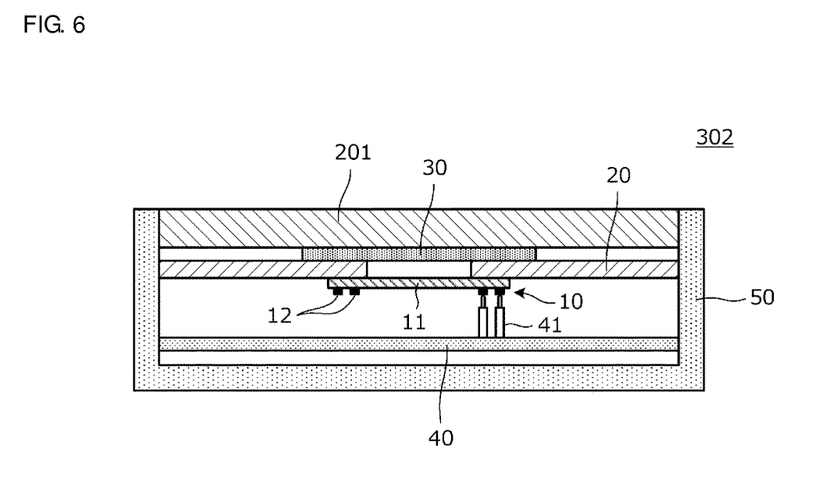
FIG. 6 is a sectional view of an electronic appliance 302 according to a second preferred embodiment of the present invention.

FIG. 6 is a sectional view of an electronic appliance 302 according to a second preferred embodiment of the present invention. The electronic appliance 302 includes a casing 50, the display device 201, the power feeding coil 10, the magnetic sheet 30, the planar conductor 20 and the circuit board 40.

In contrast to the configuration illustrated in FIG. 2 etc. in the first preferred embodiment, the power feeding coil 10 is arranged on the lower surface of the planar conductor 20 (surface on opposite side to display device 201). A power feeding circuit is provided on the circuit board 40. The power feeding circuit is connected to the two ends of the coil conductor 12 via spring pin terminals 41.

In the configuration illustrated in FIG. 6 as well, unwanted coupling between the coil conductor 12 of the power feeding coil 10 and the display device 201 is significantly reduced or prevented by the magnetic sheet 30.

In this preferred embodiment, it is easy to connect the power feeding coil 10 and the power feeding circuit.

Third Preferred Embodiment

Figure 7:
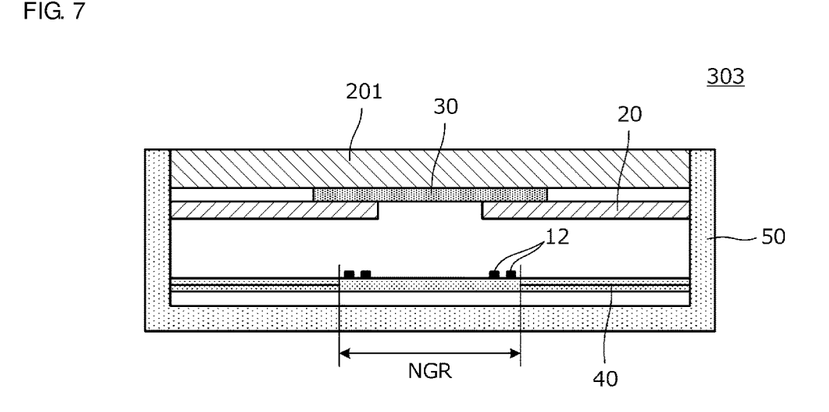
FIG. 7 is a sectional view of an electronic appliance 303 according to a third preferred embodiment of the present invention.

FIG. 7 is a sectional view of an electronic appliance 303 according to a third preferred embodiment of the present invention. The electronic appliance 303 includes the casing 50, the display device 201, the magnetic sheet 30, the planar conductor 20 and the circuit board 40.

In contrast to the first and second preferred embodiments, the coil conductor 12 of the power feeding coil is provided in a non-ground region NGR of the circuit board 40. The coil conductor 12 is preferably defined by a rectangular or substantially rectangular spiral-shaped pattern, for example. In addition, a power feeding circuit that is connected to the coil conductor 12 is provided on the circuit board 40.

In this preferred embodiment, the number of components is reduced and assembly is easy.

Fourth Preferred Embodiment

Figure 8:
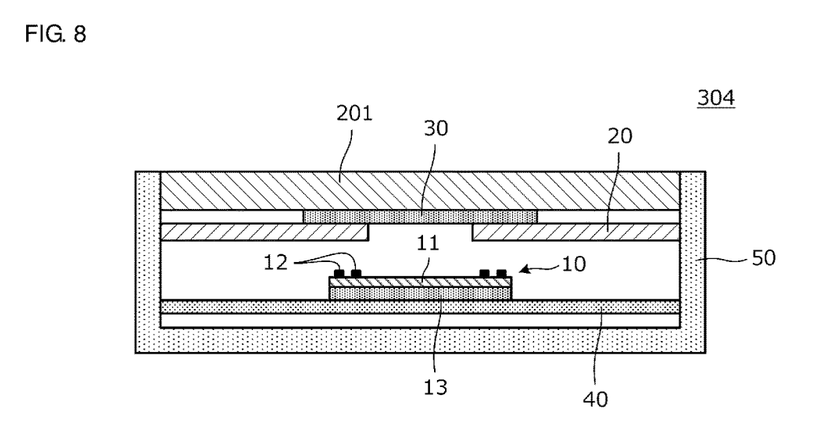
FIG. 8 is a sectional view of an electronic appliance 304 according to a fourth preferred embodiment of the present invention.

FIG. 8 is a sectional view of an electronic appliance 304 according to a fourth preferred embodiment of the present invention. The electronic appliance 304 includes the casing 50, the display device 201, the power feeding coil 10, the magnetic sheet 30, the planar conductor 20 and the circuit board 40.

In contrast to the above-described preferred embodiments, the power feeding coil 10 is mounted on the circuit board 40 side of the appliance. In addition, a magnetic sheet 13 is interposed between the power feeding coil 10 and the circuit board 40.

In this preferred embodiment, the magnetic sheet 13, which is interposed between the power feeding coil 10 and the circuit board 40, significantly reduces or prevents unwanted coupling between the coil conductor 12 of the power feeding coil 10 and a ground conductor of the circuit board 40. Consequently, the generation of an eddy current in the ground conductor is able to be prevented even when the power feeding coil 10 is mounted in a ground region of the circuit board 40. In other words, there is no need to provide a non-ground region in which to mount the power feeding coil 10 on the circuit board 40.

Fifth Preferred Embodiment

Figure 9:
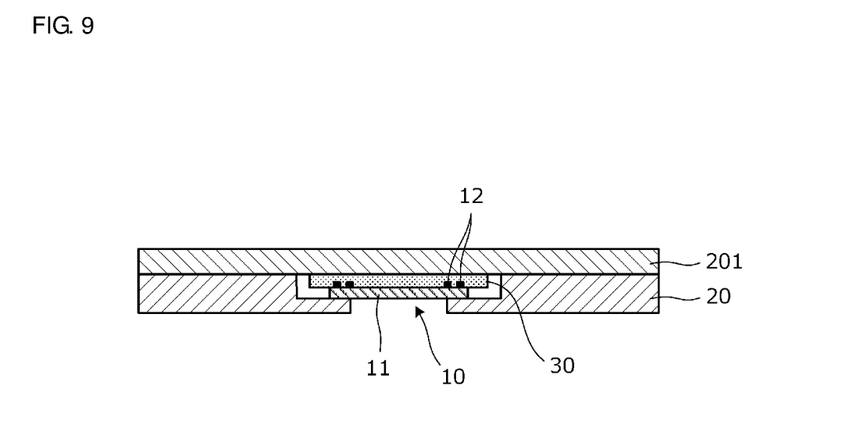
FIG. 9 is a sectional view of an integrated module including an antenna device and a display device, according to a fifth preferred embodiment of the present invention.

FIG. 9 is a sectional view of an integrated module, which includes an antenna device and a display device, according to a fifth preferred embodiment of the present invention. An upper surface of the display device 201, in the state illustrated in FIG. 9, is a display surface of the display device 201. The antenna device of this preferred embodiment is integrated with the rear surface of the display device 201. The magnetic sheet 30 and the power feeding coil 10 are integrated into a multilayer body. This multilayer body is adhered to the rear surface of the display device 201. In addition, the planar conductor 20 is adhered to the rear surface of the display device 201. A recess to accommodate the multilayer body including the magnetic sheet 30 and the power feeding coil 10, is provided in the planar conductor 20.

By accommodating the power feeding coil 10 and the magnetic sheet 30 inside the planar conductor 20 in the thickness direction of the planar conductor 20, an appliance may be formed that has a planar shape on the whole.

Sixth Preferred Embodiment

Figure 10A:
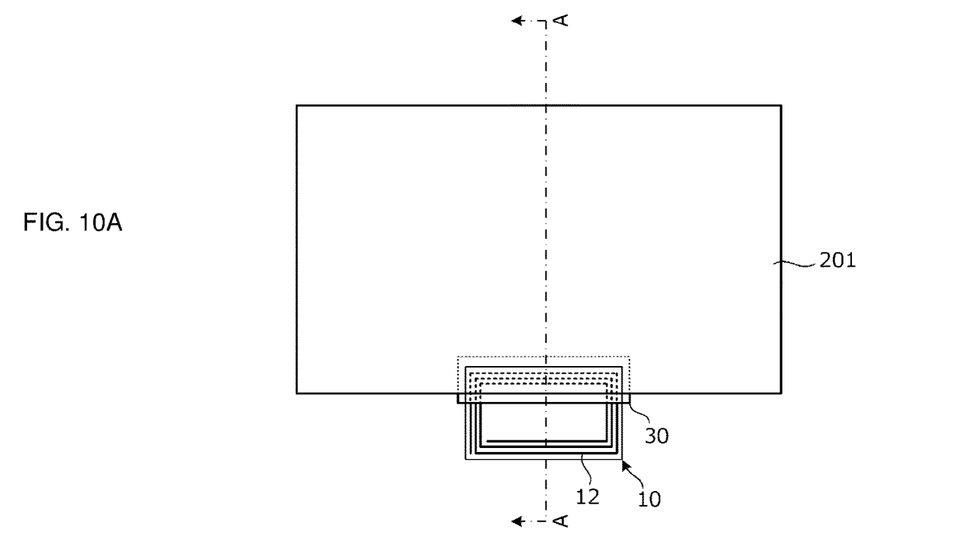
FIG. 10A is a plan view of a main portion of an electronic appliance including an antenna device according to a sixth preferred embodiment of the present invention and FIG. 10B is a sectional view taken along A-A in FIG. 10A.
Figure 10B:
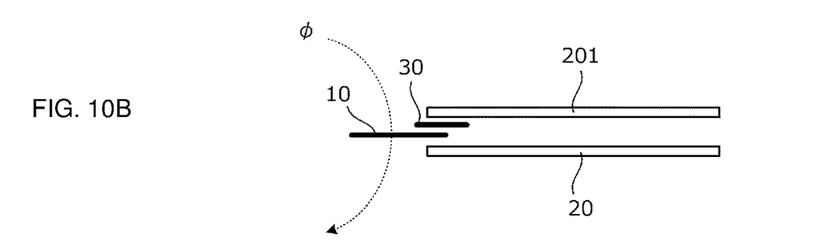

FIG. 10A is a plan view of a main portion of an electronic appliance including an antenna device according to a sixth preferred embodiment of the present invention and FIG. 10B is a sectional view taken along A-A in FIG. 10A.

The antenna device of this preferred embodiment is arranged on the rear surface side of the display device 201. The antenna device of this preferred embodiment includes the planar conductor 20, the power feeding coil 10 and the magnetic sheet 30.

A portion of the coil conductor 12 provided in the power feeding coil 10 protrudes toward the outside from an outer edge of the planar conductor 20. The magnetic sheet 30 is arranged between the coil conductor 12 and the display device 201. Magnetic flux passes through the power feeding coil 10 as indicated by magnetic flux $\phi$ in FIG. 10B.

In contrast to the example illustrated in FIG. 1, there is no silt or aperture in the planar conductor 20. Thus, a planar conductor not having a slit or aperture therein may also be used. In addition, the power feeding coil 10 may be arranged along a short edge or a long edge of the planar conductor.

In this preferred embodiment, since it is not necessary to form a cutout portion in the planar conductor 20, the shielding function and strength of the planar conductor 20 is able to be maintained. In particular, the structure of this preferred embodiment has high applicability to tablet PCs having a comparatively large bezel, for example. Furthermore, the magnetic sheet 30 does not need to be arranged in portions other than where the coil conductor 12 is superposed with the display device 201. Therefore, particularly in the case where there is no cutout portion, since the magnetic sheet does not overlap the coil conductor 12, not only is magnetic flux collected/radiated indirectly through the coil conductor 12 coupling with the planar conductor 20 but the coil conductor 12 also directly collects/radiates magnetic flux.

Seventh Preferred Embodiment

Figure 11A:
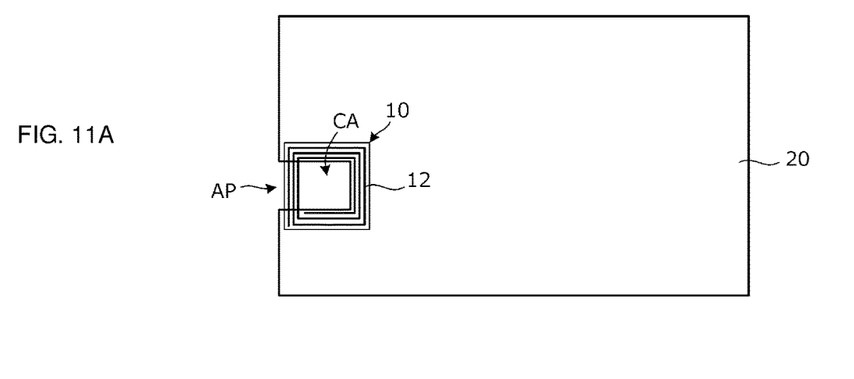
FIGS. 11A and 11B are plan views of an antenna device according to a seventh preferred embodiment of the present invention.
Figure 11B:
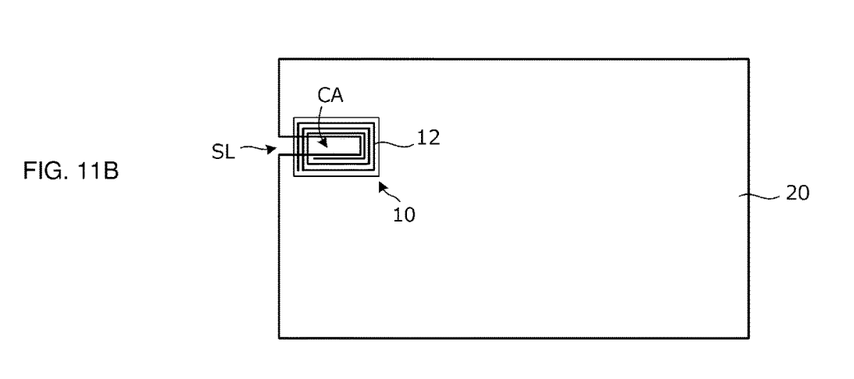

FIGS. 1A and 1B1 are plan views of antenna devices according to a seventh preferred embodiment of the present invention. The cutout portions in both antenna devices have different shapes from that in the antenna device illustrated in FIG. 1.

In the example in FIG. 11A, the aperture AP is provided in the planar conductor 20 but there is no slit SL. In the example in FIG. 11B, the slit SL is provided in the planar conductor 20 but there is no aperture AP.

In both of the antenna devices illustrated in FIGS. 11A and 11B, the power feeding coil 10 is arranged so as to be close to the planar conductor 20 and such that at least a portion of the coil aperture CA is located closer to the outside than an outer edge of the planar conductor 20 in plan view.

In FIGS. 11A and 11B, illustration of the display device and the magnetic sheet is omitted. The magnetic sheet is arranged between the display device and the planar conductor 20 and between the display device and the power feeding coil 10 and is arranged so as to be superposed with the coil conductor 12 in plan view.

As illustrated in this preferred embodiment, the cutout portion in the planar conductor 20 need not include the slit SL or the aperture AP and may be a cutout portion in which the width substantially does not change. It is preferable that at least an outer edge of the coil conductor 12 be superposed with the planar conductor 20. As a result, the coil conductor 12 and the planar conductor 20 strongly couple with each other and the ability of the planar conductor 20 to function as an element that radiates magnetic flux is increased. However, there is a certain degree of coupling between the coil conductor 12 and the planar conductor 20 even when the coil conductor 12 and the planar conductor 20 are just close to each other, and therefore there is an effect due to the coil conductor 12 and the planar conductor 20 being close to each other even if an outer edge of the coil conductor 12 and the planar conductor 20 are not superposed with each other. Here, "close to each other" refers to the coil conductor 12 and the planar conductor 20 being close to each other to such a degree that the interval between the coil conductor 12 and the planar conductor 20 is close to being equal or less than the size of the coil aperture CA.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An antenna device that is to be built into an electronic appliance equipped with a display device including a conductor layer, the antenna device comprising:
    a planar conductor that is arranged on a side of the display device that is opposite to a display surface side of the display device; and
    a power feeding coil that includes a loop-shaped or spiral-shaped coil conductor with a coil aperture at a center thereof; wherein
    the power feeding coil is arranged so as to be close to the planar conductor and such that at least a portion of the coil aperture thereof is located closer to an outside of the antenna device than an outer edge of the planar conductor in plan view;
    a magnetic sheet that is superposed with the coil conductor in plan view is arranged between the display device and the planar conductor and between the display device and the power feeding coil;
    the antenna device further comprises a circuit board that is arranged on a side of the planar conductor that is opposite to a display device side of the planar conductor; and
    the antenna device performs communication by magnetic field coupling with an antenna of a communication partner that is close to the display surface side.

2. The antenna device according to claim 1, wherein the power feeding coil is arranged such that at least a portion of the coil conductor thereof is superposed with the planar conductor in plan view.

3. The antenna device according to claim 1, wherein
the planar conductor includes a cutout portion; and
at least a portion of the coil aperture of the power feeding coil is superposed with the cutout portion in plan view.

4. The antenna device according to claim 1, wherein the magnetic sheet is arranged in at least a portion of a region where the display device and the coil are superposed with each other in plan view.

5. The antenna device according to claim 1, wherein at least a portion of the coil conductor is not superposed with the magnetic sheet and the display device in plan view.

6. The antenna device according to claim 1, wherein the planar conductor is a display device shield that is arranged on the side of the display device that is opposite to the display surface side of the display device.

7. The antenna device according to claim 1, wherein an outer shape of the magnetic sheet is smaller than an outer shape of the planar conductor and larger than an outer shape of the coil conductor.

8. The antenna device according to claim 1, further comprising:
a power feeding circuit provided on the circuit board; wherein
the power feeding coil is arranged on a surface of the planar conductor that is on a side opposite to the display surface side of the planar conductor; and
the power feeding coil is connected to the power feeding circuit provided on the circuit board via a connection conductor.

9. The antenna device according to claim 1, further comprising:
a circuit board on which a power feeding circuit is provided; wherein
the power feeding coil is provided on the circuit board.

10. The antenna device according to claim 1, wherein
the power feeding coil includes a base layer and a coil conductor that is provided on the base layer; and
the power feeding coil is arranged on a surface of the circuit board that is on a planar conductor side of the circuit board and a second magnetic sheet is arranged between the power feeding coil and the circuit board.

11. An electronic appliance comprising:
the antenna device according to claim 1;
a display device; and
a casing that accommodates the antenna device and the display device.

12. An antenna device that is to be built into an electronic appliance equipped with a display device including a conductor layer, the antenna device comprising:
a planar conductor that is arranged on a side of the display device that is opposite to a display surface side of the display device; and
a power feeding coil that includes a loop-shaped or spiral-shaped coil conductor with a coil aperture at a center thereof; wherein
the power feeding coil is arranged so as to be close to the planar conductor and such that at least a portion of the coil aperture thereof is not superposed with the planar conductor in plan view and such that at least a portion of the coil conductor thereof is superposed with the planar conductor in plan view;
a magnetic sheet that is superposed with the coil conductor in plan view is arranged between the display device and the planar conductor and between the display device and the power feeding coil;
the antenna device further comprises a circuit board that is arranged on a side of the planar conductor that is opposite to a display device side of the planar conductor; and
the antenna device communicates by magnetic field coupling with an antenna of a communication partner that is close to the display surface side.

13. The antenna device according to claim 12, wherein a second magnetic sheet is arranged between the power feeding coil and the circuit board.

14. The antenna device according to claim 12, wherein the planar conductor is a metal plate that reinforces the display device.

15. The antenna device according to claim 12, wherein
the planar conductor includes a cutout portion; and
at least a portion of the coil aperture of the power feeding coil is superposed with the cutout portion in plan view.

16. The antenna device according to claim 12, wherein the magnetic sheet is arranged in at least a portion of a region where the display device and the coil are superposed with each other in plan view.

17. The antenna device according to claim 12, wherein at least a portion of the coil conductor is not superposed with the magnetic sheet and the display device in plan view.

18. The antenna device according to claim 12, wherein the planar conductor is a display device shield that is arranged on the side of the display device that is opposite to the display surface side of the display device.

19. The antenna device according to claim 12, further comprising:
a circuit board on which a power feeding circuit is provided; wherein
the power feeding coil is provided on the circuit board.

20. An electronic appliance comprising:
the antenna device according to claim 12;
a display device; and
a casing that accommodates the antenna device and the display device.

* * * * *